United States Patent [19]

Larvoire et al.

[11] Patent Number: 5,535,409
[45] Date of Patent: Jul. 9, 1996

[54] APPARATUS FOR AND METHOD OF PREVENTING CHANGES OF COMPUTER CONFIGURATION DATA BY UNAUTHORIZED USERS

[75] Inventors: Jean-François Larvoire, Meylan; Thierry Ribollet, Grenoble; Bertrand Hays, Echirolles, all of France

[73] Assignee: Hewlett-Packard Company, Palo Alto, Calif.

[21] Appl. No.: 264,840

[22] Filed: Jun. 23, 1994

Related U.S. Application Data

[63] Continuation of Ser. No. 868,499, Apr. 15, 1992, abandoned.

[30] Foreign Application Priority Data

Apr. 16, 1991 [FR] France .................................. 91 04898

[51] Int. Cl.$^6$ ...................................... G06F 12/00
[52] U.S. Cl. .......................... 395/800; 395/427; 395/429; 395/430; 364/243; 364/243.7; 364/244.9; 364/246.8; 364/246.9; 364/DIG. 1
[58] Field of Search ...................... 395/800, 425, 395/427, 429, 430; 364/DIG. 1, 243, 243.7, 244.9, 246.8, 246.9

[56] References Cited

U.S. PATENT DOCUMENTS

| | | | |
|---|---|---|---|
| 4,757,533 | 7/1988 | Allen et al. | 380/25 |
| 4,758,718 | 7/1988 | Fujisaki et al. | 235/487 |
| 4,800,590 | 1/1989 | Vaughan | 380/25 |
| 4,888,652 | 12/1989 | Sander | 360/5 |
| 4,919,545 | 4/1990 | Yu | 380/25 |
| 5,023,782 | 6/1991 | Lutz et al. | 364/405 |
| 5,027,396 | 6/1991 | Platteter et al. | 380/4 |
| 5,113,518 | 5/1992 | Durst, Jr. et al. | 395/500 |
| 5,206,938 | 4/1993 | Fujioka | 395/400 |
| 5,222,135 | 6/1993 | Hardy et al. | 380/4 |
| 5,251,125 | 10/1993 | Karnowski et al. | 364/189 |

FOREIGN PATENT DOCUMENTS

A-2181281  4/1987  United Kingdom .

OTHER PUBLICATIONS

IBM Technical Disclosure Bulletin, vol. 30, No. 5, Oct. 1987, New York, U.S., pp. 57–58 Security System For Personal Computers.

Bergman, "A Password–Protected Power Controller", IEEE 1988, pp. 252–257.

*Primary Examiner*—Alyssa H. Bowler
*Assistant Examiner*—Dzung C. Nguyen

[57] ABSTRACT

A protection system for a computer is provided. This system is essentially based on the provision of an EEPROM (20) of unstandard access and containing configuration data of the computer as well as a password. As power-on, the contents of the EEPROM except eventually the password, are copied into a CMOS memory (16) which must conventionally be present in the computer. The invention eventually provides additional circuitry for irreversibly cutting the access to the EEPROM and specified peripheric devices.

8 Claims, 2 Drawing Sheets

APPARATUS FOR AND METHOD OF PREVENTING CHANGES OF COMPUTER CONFIGURATION DATA BY UNAUTHORIZED USERS

This application is a continuation of application Ser. No. 07/868,499 filed Apr. 15, 1992 now abandoned.

BACKGROUND OF THE INVENTION

The present invention relates to the protection of a computer and in particular to the protection of confidential data stored in memory.

FIG. 1 very schematically shows a conventional computer architecture. It includes a central processing unit (CPU) 10 connected to a terminal 11 comprising a screen and a keyboard; to volatile central random access memory (RAM) 12; to a non-volatile read only memory (ROM) 13; to a mass storage device 14, such as hard disk or a floppy disk; to groups of peripheric devices P1 and P2, such as printers, other disks, etc.; and to a volatile battery powered CMOS memory 16 where configuration data defined by the operator are stored. The configuration data comprise information for adapting and adjusting, or "configure", the computer as a function of initial options desired by the operator and, especially, so that the computer can correctly use its peripheric devices, such as the screen, the keyboard, the hard disk, etc.

Nowadays, certain computers are inoperable by a person now knowing the password at power-on of the computer. Indeed, at power-on and before the computer can be used, a password is asked. However, such a computer is vulnerable when it is on and the password has been entered.

More sophisticated computers, such as models 286N and 386N manufactured by the firm Compaq, offer security functions. Among the configuration data there are a password and access prohibitions to a group of peripheric devices, for example P1, wherein the prohibitions cannot be raised, theoretically, unless the password is known. For example, access can be prohibited to a hard disk of a computer which stays on unwatched in order to prevent an unauthorized person from accessing the data stored on the disk.

To enhance the security, for reasons which will be discussed later, the password is stored in an area of the CMOS memory 16, the access of which can be irreversibly cut while the computer is on. The access to the other configuration data must not be cut because the operating system of the computer must be able to use them. The operation of such a computer is as follows.

At power-on of the computer (cold boot), the computer must perform a certain number of operations before the operator can use it. These operations are generally the following.

a) A Power-On Self Test program (POST), which is permanently stored in ROM 13, is executed by the CPU 10. This program reads the configuration data in CMOS memory 16, these data including the password and the access prohibitions, then asks the operator to provide a password and continues its execution if the password is good.

b) the POST configures the computer, adjusts the peripheric devices and cuts the accesses to the prohibited peripheric devices, for example group P1.

c) During the execution of the POST, the operator can choose to modify the configuration. This choice is generally achieved by hitting a key before the end of a predetermined time interval. In this case, the POST executes a configuration program, usually called SETUP, stored in ROM. As program SETUP is executed, the operator can see on the screen the actual configuration stored in the CMOS memory, and propose modifications. The configuration is then modified in the CMOS memory. To validate the new configuration, operation b) must be resumed, which can only be done, in general, by rebooting the computer.

d) Before terminating, the POST cuts the access to the password stored in the CMOS memory and loads into the central memory 12 an operating system stored on the mass storage device 14. The operating system is a program which uses the configuration data stored in the CMOS memory, manages the computer and allows the operator to exploit the computer in a simple way.

When the mass storage device 14 is a hard disk containing the operating system permanently, in practice, the operator also has the possibility to use an operating system stored on a floppy disk. Therefore, a floppy disk drive is provided in which the operator inserts the floppy disk and, when the computer is rebooted, the POST will first attempt to load the operating system from this floppy disk. It will be considered hereafter that the computers have a hard disk as mass storage device 14 to which a floppy disk can be substituted and wherein the loading of the operating system is first attempted from a floppy disk.

To reboot the computer it is also possible to do a warm boot, i.e. a reset of the computer while its power is still on. It unprotected computers, this has the same effect as a cold boot, except that it is faster.

A drawback of known computers is that the CMOS memory 16 is easily accessed. The access to this memory is standard so that it is compatible with all available operating systems. Thus, a hacker having some technical knowledge, knows how to modify the accessible content of the CMOS memory by using, for example, a debugger program, generally available with the operating system, which allows data to be written and read in memory areas, especially in the CMOS memory. The hacker is also able to reboot on a floppy disk containing a program which is executed automatically and can, for example, modify the contents of the CMOS memory in a short time.

In the above mentioned 286N and 386N computer models, during a warm boot, access to the password in the CMOS memory is not reestablished and the password cannot be used by the POST. During such a boot, the POST must still be executed to configure the computer. Thus, since the POST does not then block the use of the computer by a password, a hacker can do a warm boot on a floppy disk in a disk drive to which the access was not cut. Although the hacker cannot then access the password, he can cancel the access prohibitions and modify the configuration.

A floppy disk boot can be prohibited, but this is usually done by software which a competent hacker can bypass.

Moreover, erroneous instructions in a program can accidentally modify the contents of the CMOS memory.

The CMOS memory 16 is usually a battery powered volatile memory for various technical reasons; especially, this memory is associated to a real time clock. Thus, at the end of the life of the battery (about 5 years) the content of the CMOS memory will vanish.

SUMMARY OF THE INVENTION

An object of the invention is to provide a computer in which the storage life of the configuration data is unlimited.

Another object of the invention is to provide a computer protection system which is more difficult to bypass by a hacker.

Another object of the invention is to provide a computer protection system which cannot be bypassed by a person not knowing a password.

These objects are attained by a computer comprising: a volatile memory which is standardly provided for storing computer configuration data at least partially user defined, this volatile memory having a standard access mode; a non-volatile reprogrammable memory associated to programming means, this non-volatile memory having a different access mode than the volatile memory and storing said computer configuration data and user defined confidential data; and a central processing unit (CPU) operative to access both memories for, at power-on of the computer, updating the configuration data in the volatile memory with the configuration data of the non-volatile memory.

According to an embodiment of the invention, the computer comprises switch means operated, between the moment when the configuration data is updated in the volatile memory and the next power-on of the computer, for cutting the accesses of the computer to the non-volatile memory and to peripheric devices determined by the user defined configuration data.

According to an embodiment of the invention, the computer comprises a second volatile memory only accessible through a verifying circuit in which are provided: means for communicating with the CPU; means for writing in the second volatile memory, at power-on, a password included in the user defined confidential data; and a comparator for comparing a password, to be provided by the user through the CPU, to the password stored in the second volatile memory and for operating the switch means to reestablish the cut accesses if the result of the comparison is good.

According to an embodiment of the invention, the computer comprises a flip-flop closing of the switch means when it is at an active state, this active state being set by a power-on reset circuit and the inactive state being set through the CPU.

According to an embodiment of the invention, the computer comprises a flip-flop closing the switch means when it is at an active state, this active state being set by the verifying circuit and the inactive state being set through the CPU.

According to an embodiment of the invention, the verifying circuit and the second volatile memory are implemented in an available microcontroller of the computer.

The present invention provides a protection method for a computer including a volatile memory standardly provided for storing configuration data at least partially user defined. The method comprises the steps of: a) updating the volatile memory with configuration data stored in a non-volatile reprogrammable memory having a different access mode than the volatile memory; and b) comparing a password to be provided by a user to a password stored in the non-volatile memory and continuing if the passwords are equal.

According to an embodiment of the invention, the method comprises the additional steps of: c) adjusting the configuration of the computer according to the configuration data stored in the non-volatile memory; and d) if the user carries out a specific action, writing new configuration data provided by the user in the non-volatile memory.

According to an embodiment of the invention, the method comprises the additional step of cutting the accesses of the computer to the non-volatile memory and to peripheric devices defined by the user in the configuration data, the cut accesses only being reestablished at power-on.

According to an embodiment of the invention, at power-on, the password stored in the non-volatile memory is written in a second volatile memory only accessible through a verifying circuit, this circuit carrying out, upon a warm boot or a specific action of the user, the steps of: comparing the password to be provided by the user to the password stored in the second volatile memory; and reestablishing the cut accesses if the result of the comparison is good so that a modification by the user of the contents of the non-volatile memory is possible. The reestablished accesses are cut again once the password has been provided, and, when necessary, the contents of the non-volatile memory have been modified by the user.

BRIEF DESCRIPTION OF THE DRAWINGS

The foregoing and other objects, features and advantages will be described in more detail in the following description by referring to the accompanying drawings among which.

DETAILED DESCRIPTION OF THE PREFERRED EMBODIMENTS

Figure 1:
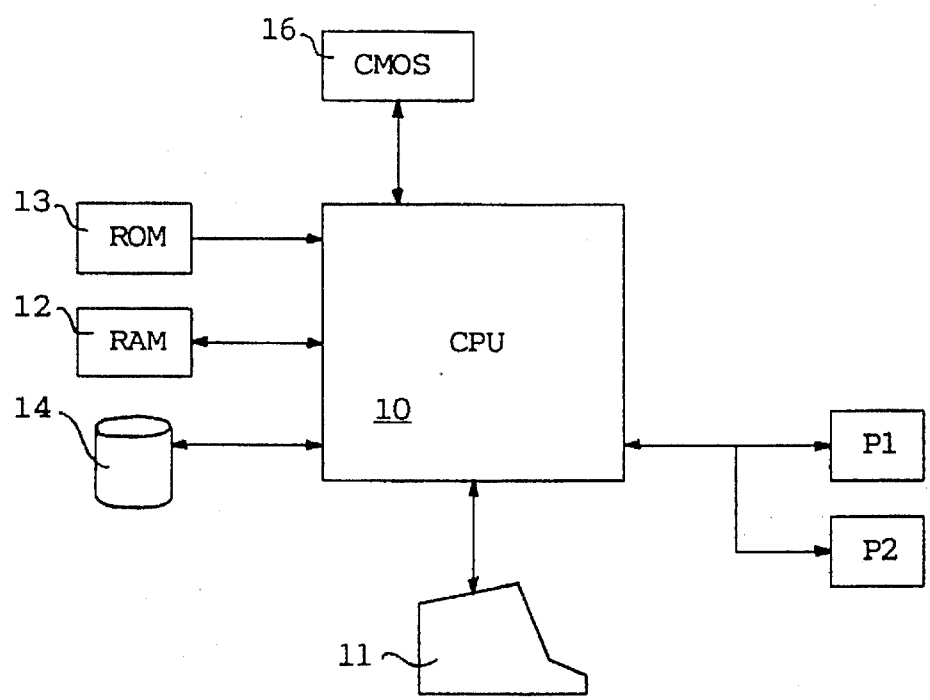
FIG. 1, previously described, very schematically represents a conventional computer architecture.
Figure 2:
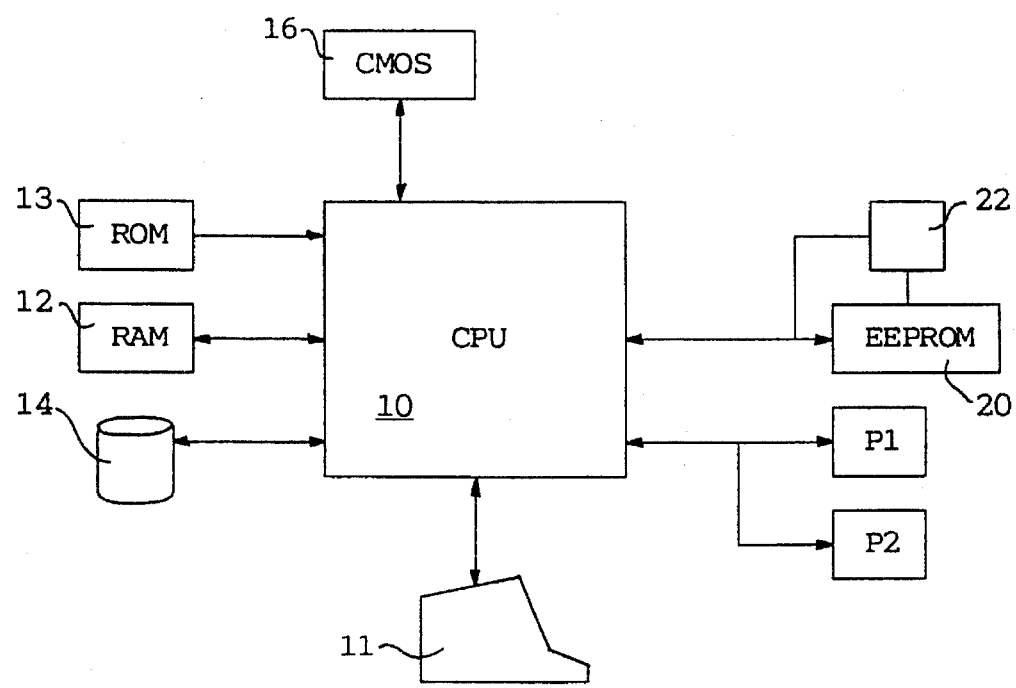
FIGS. 2, 3 and 4 schematically represent computer architectures according to the embodiments of the invention.

In FIG. 2, the same elements as in FIG. 1 are shown, designated by the same reference numbers. According to the invention, the computer comprises a non volatile electrically eraseable and programmable read only memory (EEPROM) 20 connected to the CPU 10, this memory being associated to an erasing and programming circuit 22. CMOS memory 16 need no longer be battery powered.

In the EEPROM are stored the configuration data including a password and access prohibitions to peripheric devices P1. Memories EEPROM 20 and CMOS 16 are used in the following manner according to the invention.

—At boot time, a suitable POST program is executed. It reads the data in the EEPROM memory and transfers them, except for the password, into the CMOS memory. It asks for the password and continues its execution in a conventional manner if the provided password is good.

—The operator can conventionally invoke a suitable SETUP program stored in ROM. The configuration data modifications proposed by the operator are then written into the EEPROM 20. The remaining operations are conventional.

A second suitable SETUP program on disk can also be invoked to modify the configuration. This SETUP program will ask for the password stored in the EEPROM memory and will carry out the modifications in the CMOS memory if the provided password is good.

Thus, at each boot, the configuration data stored in the EEPROM will be overwritten in the CMOS memory. This CMOS memory 16 is in fact only kept for compatibility reasons as the operating systems must be able to use it.

As it was previously mentioned, the access to the CMOS memory is standard. This access is generally achieved by writing an address in a first specific register, the data, comprised of words of a given number of bits, being read or written word by word in a second specific register. The addresses of these first and second specific registers are standard. It is thus easy to read or write in this memory without passing by the SETUP program.

The EEPROM is not submitted to compatibility requirements and its access is voluntarily rendered more complex. For example, the EEPROM can be chosen with a serial access, i.e. each data word is read or written bit by bit in the EEPROM.

Thus, the probability for a program to accidentally write data in this EEPROM is low and a hacker is submitted to the two following difficulties: on the first hand, it will be difficult for him to detect the presence of the EEPROM because he will be able to access, although without consequence, the CMOS memory which will appear to him as containing the data which interest him, and on the other hand, if he detects the presence of the EEPROM, it will be very difficult for him to find how to access it because the access to this memory is not standard and it will not be communicated to the public how it can be achieved.

Figure 3:
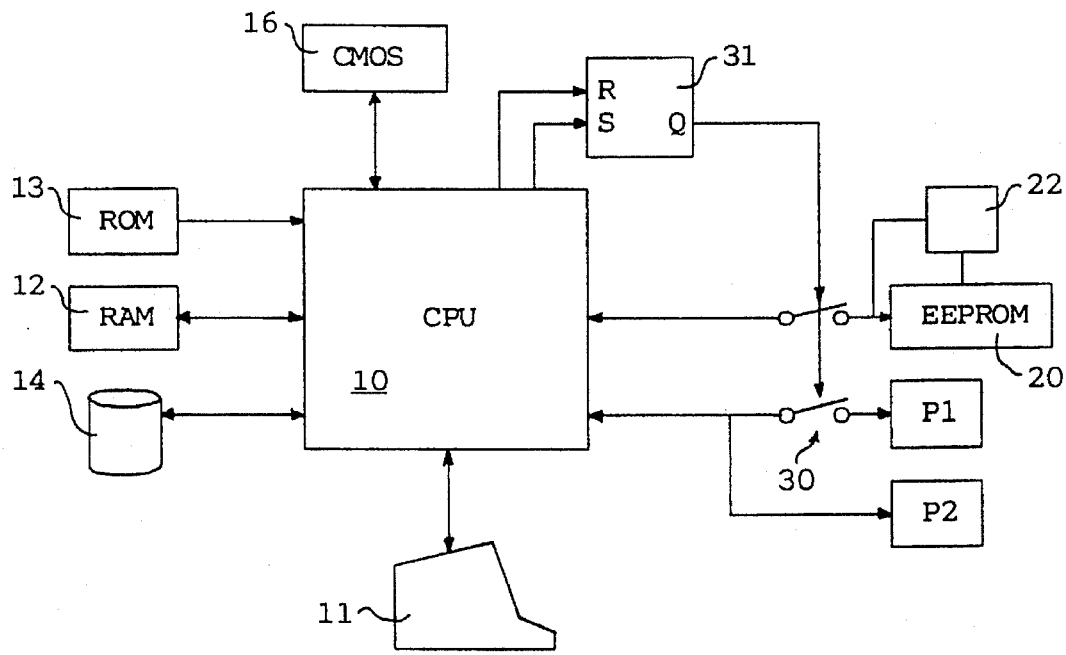

However, as the EEPROM is theoretically accessible by an operator and, as the security functions, which are generally achieved by software, can be bypassed by a competent hacker, it is provided in another embodiment of the invention shown in FIG. 3 to avoid this.

In FIG. 3, the same elements as in FIG. 2 are shown, designated by the same reference numbers. The access to the EEPROM 20 and to the peripheric devices P1 determined by the operator, can be irreversibly cut by switches 30 controlled, for example, by an RS flip-flop 31 itself controlled via the CPU 10. Switches 30 can be placed upon chip-select lines of the EEPROM memory and of the peripheric devices. The operation of this system is as follows.

—During a cold boot, a power-on reset circuit, generally included in the computer, provides a pulse intended to reset various circuits of the computer, the state of which is uncertain. This pulse is also provided to the reset input R of flip-flop 31, which causes all switches 30 to be closed.

—The POST is executed as described for FIG. 2, that is, it reads the contents of EEPROM 20, and transfers them, except for the password, to the CMOS memory 16. The password is verified and the POST continues conventionally if the password is good.

—The operator can invoke the SETUP program stored in ROM 13 to modify in the EEPROM the configuration data and access prohibitions to peripheric devices.

—The POST continues and before loading the operating system, it causes the CPU 10 to send a pulse on the set input S of flip-flop 31 which opens switches 30 and cuts the access to the EEPROM and to the peripheric devices P1 determined by the data initially contained in the EEPROM.

Whatever the hacker might do, it is impossible for him to access the EEPROM and the prohibited peripheric devices. Indeed, the switches 30 prohibiting this access can only be closed by the above mentioned power-on reset circuit on a cold boot, which is when the password must be provided.

During a warm boot of such a computer, switches 30 remain open, still cutting the access to the data in the EEPROM, especially to the password. These data can therefore not be used by the POST which, during such a boot, must however be executed to readjust the reversible configuration, i.e. the configuration which is not affected by switches 30. Without asking for a password, the POST will adjust the reversible configuration from the data stored in the CMOS memory, whereas the contents of the CMOS memory could have been modified by a hacker or a defect program. Moreover, as the POST does not block the use of the computer by a password, a hacker will be able to do a warm boot on a floppy disk in a disk drive to which the access has not been prohibited.

Furthermore, if the operator wants to reconfigure his computer, he must necessarily reestablish the access to the EEPROM, i.e. he must switch the computer off and back on, which is tedious.

Figure 4:
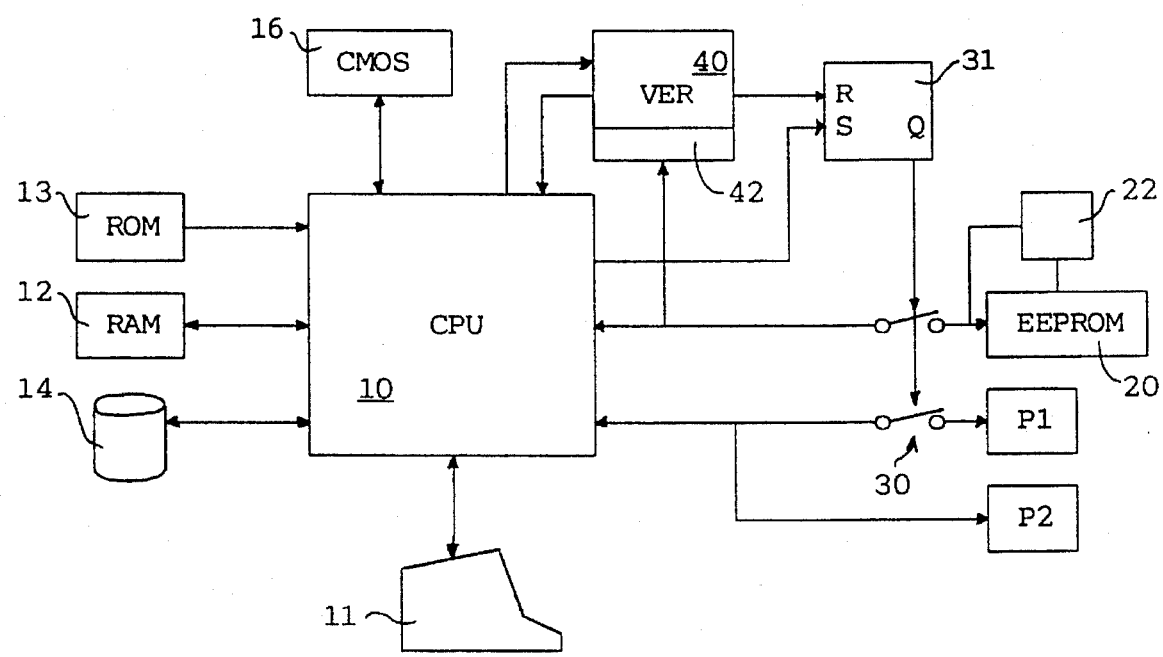

FIG. 4 shows an embodiment of the invention overcoming the above drawbacks. The same elements as in FIG. 3 are shown, designated by the same reference numbers. The reset input R of flip-flop 31 is here controlled by a password verifying circuit 40. The operation of this system is as follows.

—At power-on, the verifying circuit 40 sends a pulse to the reset input R of flip-flop 31 which closes switches 30. A suitable POST program starts, reads the contents of the EEPROM 20 and writes them, except for the password, in the CMOS memory 16.

—The POST asks the operator to provide a password and continues if the password is good. The password contained in the EEPROM is copied in a memory 42 of the verifying circuit 40. This memory 42 is such that is can only be written once at power-on. That is, for example, achieved by an access attempt counter (non represented) which is reset at power-on. The POST continues conventionally.

—The operator can invoke the SETUP program stored in ROM as previously and update the EEPROM with new configuration data.

—The POST continues and, before loading the operating system, causes the CPU to send a pulse to the set input S of flip-flop 31 which opens switches 30 of the EEPROM and the selected peripheric devices P1.

On a warm boot, the POST attempts to read in the EEPROM and detects that the latter does not answer. The POST still asks for the password and communicates it, via the CPU, to the verifying circuit 40 which compares it to the password stored in its memory 42. The verifying circuit transmits the result of the comparison to the CPU to allow the POST to continue if the right password is provided. If the right password is provided, the verifying circuit 40 sends a pulse to the reset input R of flip-flop 31 which closes switches 30. The continuation of the POST is authorized and the operator can invoke the SETUP program stored in ROM to modify the contents of the EEPROM. The POST causes the switches 30 to open before loading the operating system, as described for FIG. 3.

The operator will also be able, when the computer is on, to invoke a second suitable SETUP program stored on disk, which will ask for the password and will transmit it to the verifying circuit 40 via the CPU 10. In this case too, if the right password is provided, the verifying circuit will close switches 30 and will allow the operator to modify the data in the EEPROM. This second SETUP program is, like the POST, such that it causes switches 30 to reopen before terminating.

Thus, such a system is practical for the operator which can at any time change the configuration but is invulnerable to a hacker which does not know the password. Indeed, the hacker must provide the password at cold or warm boot and, if he finds the computer on, he will nor be able to access the EEPROM, nor the prohibited peripheric devices. Moreover, the fact that it is only possible to write in memory 42 of the verifying circuit 40 at power-on, cancels the theoretical possibility that a hacker has to modify the contents of memory 42 by deleting the password or overwriting it by another password.

As it can be noted in the above description, the functions to be achieved by the verifying circuit 40 are the following:

—receiving passwords from the CPU;

—writing the first received password since power-on in memory 42 and cancelling any subsequent attempt to read or write in memory 42, at least at the location of the password;

—closing switches 30 (by sending a pulse to the reset input R of flip-flop 31) at power-on and upon receiving a subsequent password equal to the one stored in memory 42; and —transmitting the equality or non-equality of the passwords to the CPU.

These functions can easily be achieved by those skilled in the art with logic gates, comparators and flip-flops. It is particularly easy to achieve them with a suitably programmed microcontroller including its own memory. Preferably the microcontroller is allready provided in the computer, such as the keyboard controller. The microcontroller is then allready implemented for communicating with the CPU and its program only needs simple modifications to achieve the above functions. Connection pins of the microcontroller are usually available, one of them can thus be used for controlling the reset input R of flip-flop 31.

The pulses to be sent to the set input S of flip-flop 31, to open switches 30 upon request by the CPU, can easily be achieved by providing in the computer a latch, the output of which is connected to the set input of the flip-flop. The latch is then write-selectable by an address decoder responding to an unused peripheric device address (also called input/output address). To generate a pulse, the CPU will successively write a 1 and a 0 in the latch. This pulse could also be generated by the above microcontroller.

Those skilled in the art will be able to write the suitable POST, SETUP and microcontroller programs in order to achieve the described functions.

Switches 30 can be achieved by logic gates. Flip-flop 31 has been described as an RS flip-flop, but those skilled in the art will be able to choose any equivalent circuit.

We claim:

1. A computer comprising:

a first memory of a type which is conventionally provided for storing computer configuration data including user defined configuration data, said first memory having a standard access mode and storing user defined computer configuration data;

a non-volatile second memory;

programming means for reprogramming the non-volatile second memory, the second non-volatile memory having an access mode different from the standard access mode of the first memory, the second non-volatile memory storing said computer configuration data and user defined confidential data;

a central processing unit coupled with the first and second memory and the programming means for accessing both said first and non-volatile second memories for updating the computer configuration data in the first memory with the computer configuration data of the non-volatile second memory during power-on of the computer, the computer configuration data adjusting the computer configuration so the computer is correctly coupled with its peripheric devices;

switch means coupled with the central processing unit and the second non-volatile memory for normally enabling access between the central processing unit and the second non-volatile memory, the switch means being operative following further updating of the configuration data in the first memory for cutting access of the central processing unit to the non-volatile second memory and to peripheral devices specified by the user defined configuration data;

a verifying circuit coupled with the central processing unit and a third memory coupled with the verifying circuit and arranged so it can be read out and written into only through the verifying circuit, the verifying circuit having:

means coupled with the central processing unit for communicating with the central processing unit;

means coupled with the central processing unit and activated at power-on for writing into the third memory a stored password included in said user defined confidential data; and a comparator coupled with the central processing unit, the third memory and the switch means for comparing an input password provided by a user through the central processing unit with the stored password written into the third memory and for operating the switch means for re-establishing access of the central processing unit at least to the second memory in response to the input password provided by the user being the same as the stored password written into the third memory.

2. The computer of claim 1 further comprising a power-on reset circuit coupled with the central processing unit and a flip-flop and the power-on reset circuit for closing the switch means while the flip-flop is in an active state, the flip-flop being activated to the active state by the power-on reset circuit and to an inactive state through the central processing unit.

3. The computer of claim 1 wherein the second memory is electronically programmable and the programming means is responsive to the central processing unit to electronically reprogram the non-volatile second memory with computer configuration data as the configuration of the computer and its peripheral devices change.

4. The computer of claim 1 wherein the different access mode of the second memory is by a serial access.

5. A computer comprising:

a first memory of a type which is conventionally provided for storing computer configuration data including user defined configuration data, said first memory having a standard access mode and storing user defined computer configuration data;

a non-volatile second memory;

programming means for reprogramming the non-volatile second memory, the second non-volatile memory having an access mode different from the standard access mode of the first memory, the second non-volatile memory storing said computer configuration data and user defined confidential data;

a central processing unit coupled with the first and second memory and the programming means for accessing both said first and non-volatile second memories for updating the computer configuration data in the first memory with the computer configuration data of the non-volatile second memory during power-on of the computer, the computer configuration data adjusting the computer configuration so the computer is correctly coupled with its peripheral devices;

switch means coupled with the central processing unit and the second non-volatile memory for normally enabling access between the central processing unit and the second non-volatile memory, the switch means being operative following further updating of the configuration data in the first memory for cutting access of the central processing unit to the non-volatile second memory and to peripheral devices specified by the user defined configuration data;

a power-on reset circuit coupled with the central processing unit and a flip-flop and the power-on reset circuit for closing the switch means while the flip-flop is in an active state, the flip-flop being activated to the active state by the power-on reset circuit and to an inactive state through the central processing unit.

6. The computer of claim 5 wherein the verifying circuit and the third memory are included in an available microcontroller of the computer.

7. The computer of claim 5 wherein the second memory is electronically programmable and the programming means is responsive to the central processing unit to electronically reprogram the non-volatile second memory with computer configuration data as the configuration of the computer and its peripheral devices change.

8. The computer of claim 5 wherein the different access mode of the second memory is by a serial access.

* * * * *